Oct. 31, 1933.  A. C. BRADSHAW  1,933,411
STALK CUTTING MACHINE
Filed July 20, 1931   3 Sheets-Sheet 1

Albert C. Bradshaw,
INVENTOR

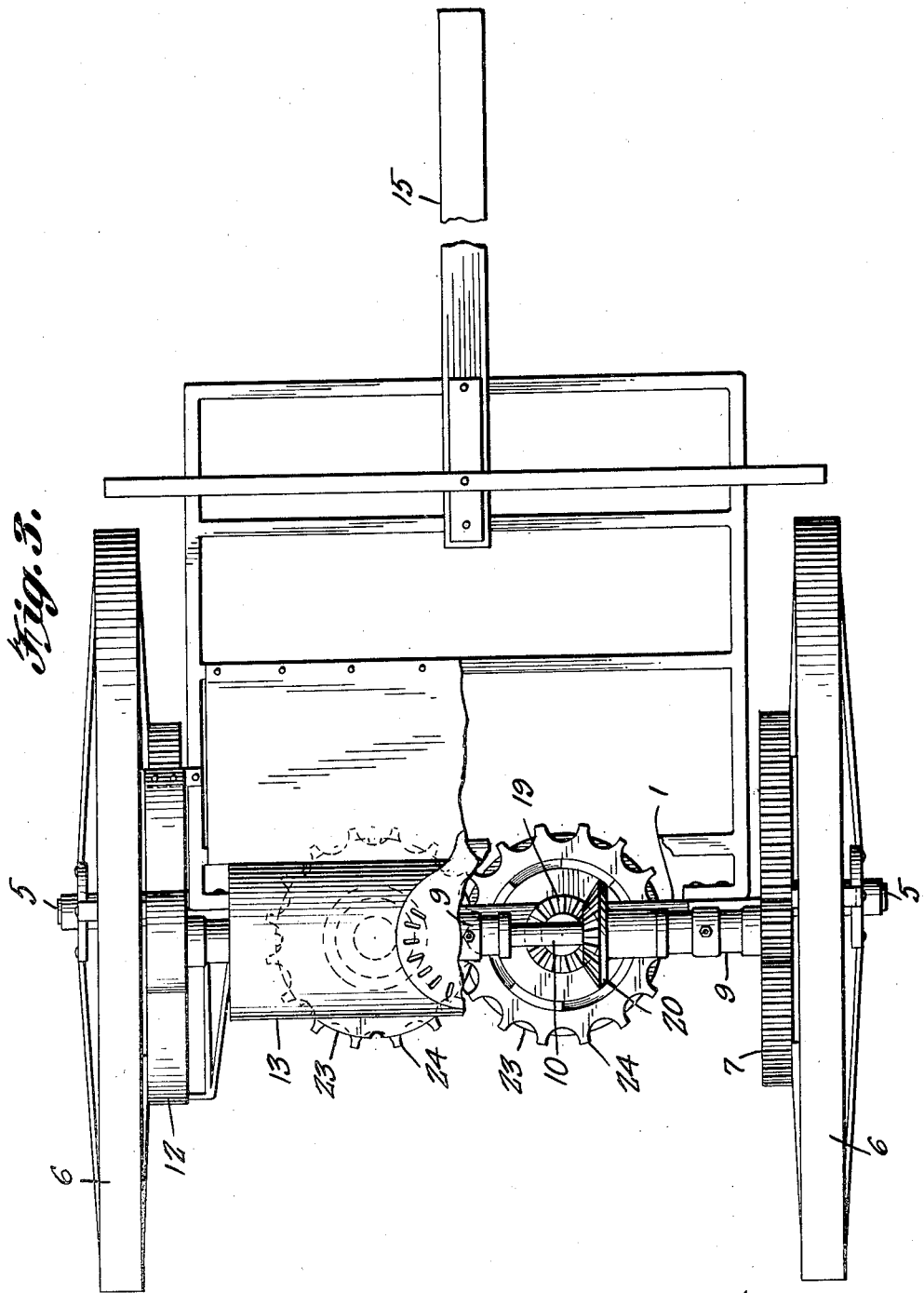

Patented Oct. 31, 1933

1,933,411

UNITED STATES PATENT OFFICE 1,933,411

STALK CUTTING MACHINE

Albert C. Bradshaw, George West, Tex., assignor to B & B Manufacturing Company, Inc., George West, Tex., a corporation of Texas Application July 20, 1931. Serial No. 551,995

1 Claim. (Cl. 56—60)

This invention relates to a stalk cutting machine and it consists in the novel features hereinafter described and claimed.

It is the purpose of this invention to provide a stalk cutter in the nature of a machine adapted to be moved over a row of standing stalks, and including spaced series of blades, each of which cooperates with a suitable guard in a manner to cut the stalks into small pieces or sections, so they can be subsequently plowed under the surface of the soil and used as a fertilizer.

The present invention is an improvement over the structure shown in my prior patent No. 1,576,405 dated March 9, 1926 and the present invention includes the following structural differences and advantages over my earlier invention.

In the present invention the blades and the guards are operated by gear wheels instead of chains and this greatly simplifies the structure of the machine making it possible to have the intermeshing gear wheels above the standing stalk instead of at lower points and thus avoiding the tangling of the stalk with the gear wheel and permitting more clearance space for the stalk to prevent such trouble.

In the present invention the central portions of the guards are in the form of webs instead of being spokes and this prevents the stalks from becoming entangled with the guards and brings about a structure lighter in weight, there being means provided at the outer sides of the guards for preventing trash from accumulating upon the guards. In the present invention the guards are provided at their peripheries with arcuate teeth which will have a tendency to effectually cut the stalk in conjunction with the blade and at the same time will promptly eject the sections of stalks from the machine.

In the present invention the hubs of the blades and the guards are in sections secured by means of clamping bolts upon the supporting shaft and consequently the said hubs may be quickly changed or spaced upon the shaft as desired. The said hubs are square and by reason of such shape the stalks cannot wind tightly upon the hubs and they may be easily knocked from the hubs.

In the present invention the intermeshing gear wheels are covered by a hood and suitable fenders which prevent the clothing of the driver or the reins of the harness from becoming entangled in the gear wheels. The machine is well balanced at the centers of the supporting wheels and consequently there is but little weight upon the necks of the draft animals.

In the accompanying drawings:—

Figure 3 is a top plan view of the same with parts removed and parts broken away.

Figure 1:
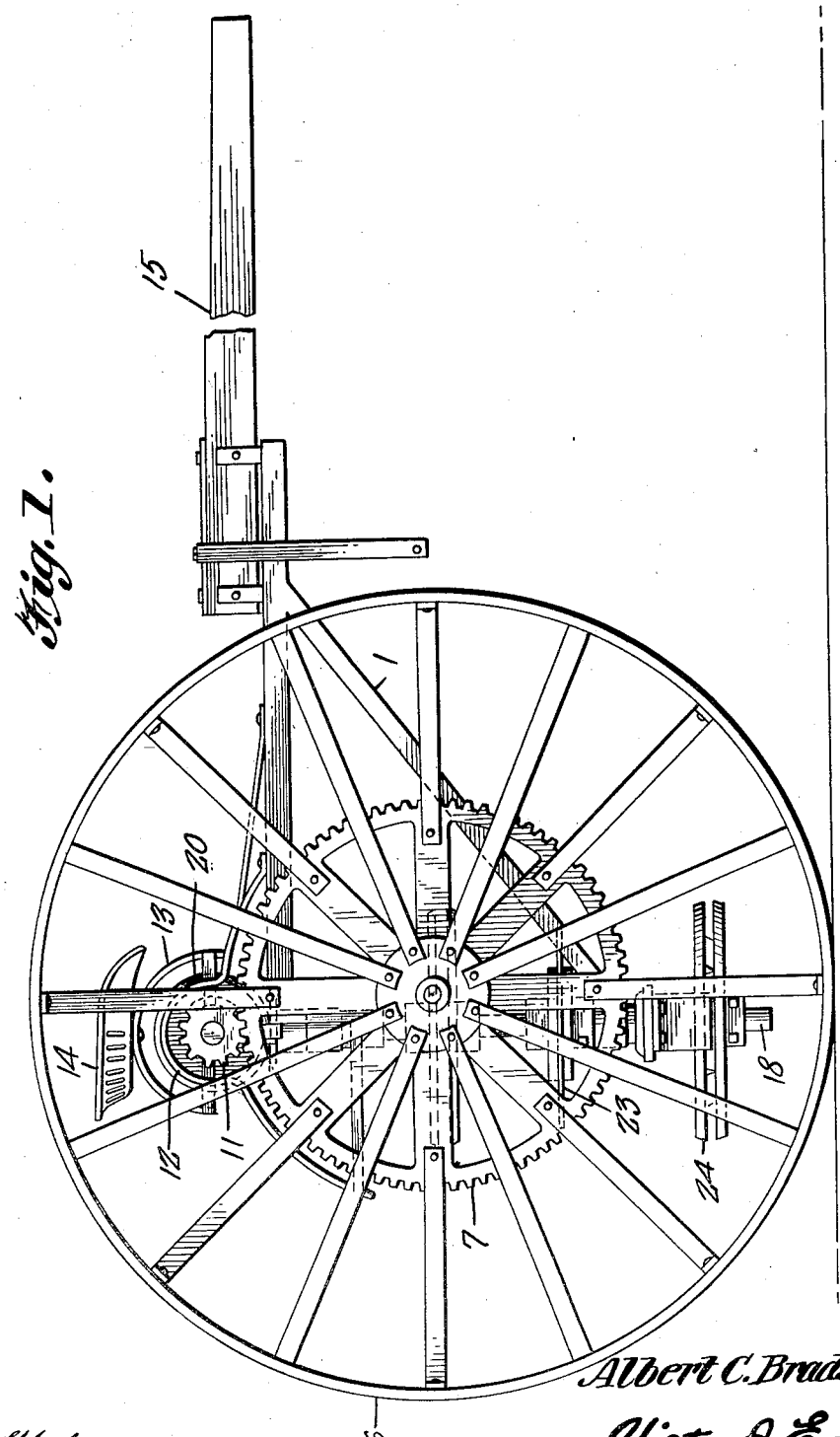
Figure 1 is a side elevational view of the improved stalk cutting machine.

The machine forming the subject matter of the present invention comprises a frame 1 having at its ends depending side portions 2 which carry at their lower ends inwardly disposed arms 3. Bearings 4 are mounted upon the side portions 2 and each bearing carries a spindle 5. Ground engaging wheels 6 are journaled upon the spindles 5 and gear wheels 7 are attached to the wheels 6 and arranged concentrically therewith. The frame 1 is provided with upwardly disposed portions 8 the said portions being located one at each end of the frame 1 and one at a point midway between the ends of the frame 1. Bearings 9 are mounted at the upper ends of the portions 8 and alined stub shafts 10 are journaled in the bearings 9. Gear wheels 11 are fixed to the outer ends of the stub shafts 10 and the teeth of the gear wheels 11 mesh with the teeth of the gear wheels 7. Fenders 12 are mounted upon the forward portion of the frame and extend rearwardly over the gear wheels 11. A hood 13 is mounted upon the frame 1 and is disposed over the stub shafts 10. A driver's seat 14 is mounted upon the hood 13. A tongue 15 is connected at its rear end with the frame 1 and draft animals (not shown) may be hitched to the tongue in a usual manner.

Bearings 16 are mounted upon the frame 1 and bearings 17 are carried at the inner ends of the arms 3, shafts 18 are journaled in the vertically alined bearings 16 and 17. Beveled gear wheels 19 are mounted at the upper ends of the shafts 18 and mesh with beveled gear wheels 20 mounted upon the stub shafts 10.

Figure 2:
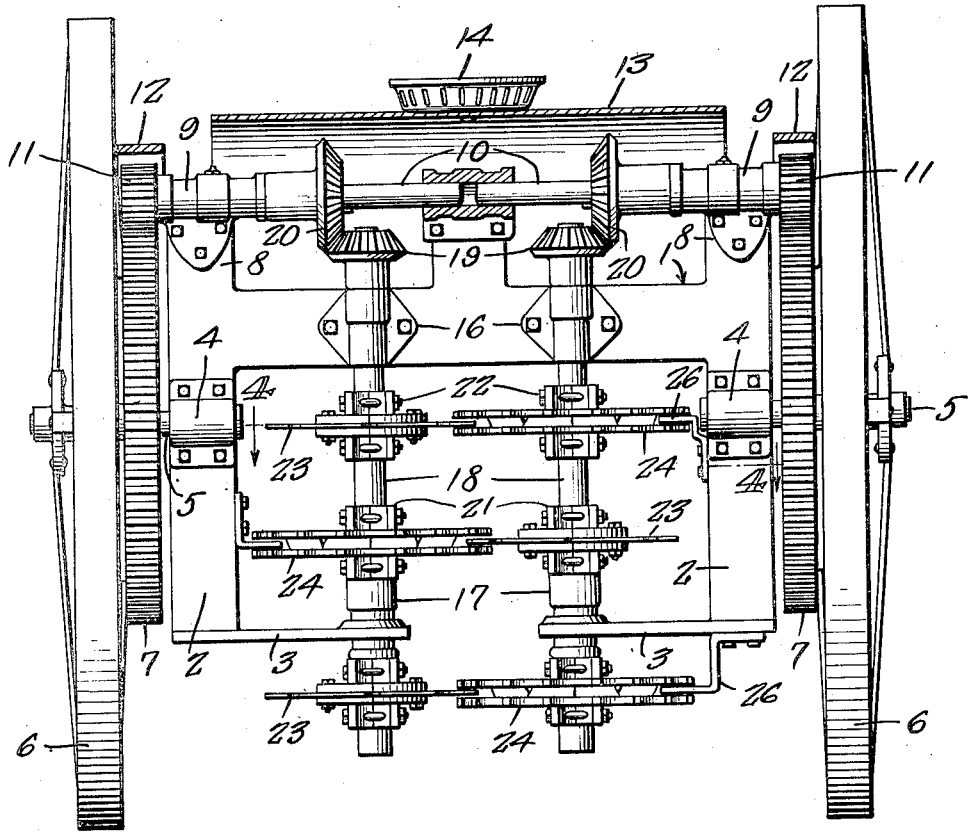
Figure 2 is a rear elevational view of the same showing parts in section.
Figure 4:
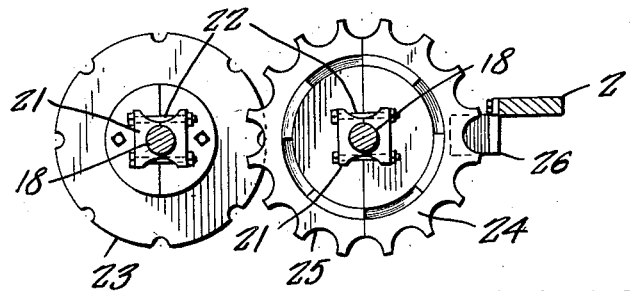
Figure 4 is a fragmentary sectional view cut on the line 4—4 of Figure 2.

Hub sections 21 are mounted upon the shafts 18 and the said sections are arranged in pairs. The sections 21 are held in position upon the shafts by means of clamp bolts 22. The hubs formed by the sections when assembled are square as shown in Figure 4 of the drawings and consequently the stalks cannot wind tightly upon the said hubs. A circular blade 23 is held between the members of each alternate pair of hubs upon the shafts 18 and between the intervening pairs of hub guard plates 24 are held. The plates 24 are provided at their peripheries with teeth 25 formed by cutting semi-circular slots in the plates at their peripheries, so that semi-circular or arcuate teeth are provided lying in the same planes as the planes of their respective plates. The plates 24 are spaced from each other and are arranged in pairs and the blade upon one shaft 18 has a peripheral portion located between the set of plates upon the other shaft 18 as best shown in Figure 2 of the drawings. Fingers 26 are mounted upon the portions 2 of the frame and the ends of the said fingers lie between the adjacent plates 24.

As the machine is drawn along a row of standing stalks the stalks enter between the shafts 18. Rotary movement is transmitted from the gear wheels 7 and through the gear wheels 11 to the stub shafts 10. From the stub shafts 10 rotary movement is transmitted by the intermeshing gear wheels 20 and 19 to the shafts 18. Thus the blades and the guards which are carried by the shafts 18 are rotated. As the blades come in contact with the stalks they are forced between the teeth 24 of the guards and the stalks are cut into sections which fall upon the surface of the ground and may be turned under the soil by subsequent plowing as hereinbefore indicated.

Having described the invention what is claimed is:

In a stalk cutter, a frame, a pair of vertical shafts depending therefrom, means for simultaneously rotating the shafts in opposite directions, a circular blade mounted upon one shaft, a pair of spaced guard plates mounted upon the other shaft, the peripheral portion of the blade being received in overlapping relation in the space between the guard plates and the guard plates being provided at their peripheries with arcuate slots extending radially inward with the axes of the generating radii parallel with the axes of the plates to provide arcuate teeth which lie at the opposite sides of the circular blade.

ALBERT C. BRADSHAW.